United States Patent [19]
Arbuckle et al.

[11] 3,760,033
[45] Sept. 18, 1973

[54] POLYESTER RESIN COMPOSITIONS

[75] Inventors: Kenneth Harold Arbuckle; David Mendel Lazarus, both of London, England

[73] Assignee: Berger, Jenson & Nicholson Limited, London, England

[22] Filed: Mar. 10, 1971

[21] Appl. No.: 123,030

[52] U.S. Cl. ......... 260/872, 117/124 E, 117/132 B, 204/159.15
[51] Int. Cl. ............................................. C08f 21/02
[58] Field of Search .................................... 260/872

[56] References Cited
UNITED STATES PATENTS
3,455,801    7/1969    D'Alelio .............................. 204/159

FOREIGN PATENTS OR APPLICATIONS
481,151    12/1969    Switzerland
156,970    1/1970    Hungary
1,301,511    8/1969    Germany
1,929,108    1/1970    Germany
2,001,985    10/1969    France OTHER PUBLICATIONS
Sedov et al., Plast. Massy 1968(11), 25–28.

*Primary Examiner*—Melvin Goldstein
*Attorney*—Wenderoth, Lind & Ponack

[57] ABSTRACT

Curable coating compositions based on unsaturated polyester resin and styrene, particularly those in which the polyester resin has a high degree of unsaturation and/or of chain branching, may be difficult to thin to application viscosity without hazing or phase separation. This problem is solved by adding a minor proportion of an unsaturated hydroxy-ester, particularly β-hydroxyethyl methacrylate or β-hydroxypropyl methacrylate.

4 Claims, No Drawings

POLYESTER RESIN COMPOSITIONS

The present invention relates to compositions containing unsaturated polyester resins. Through a suitable choice of reactants and cross-linking agents, such compositions can provide the basis of surface coatings which, when suitably initiated, may be caused to harden in minutes or seconds, rather than in the hours or days required by the older materials containing natural products. Such synthetic unsaturated polyester resins, when mixed with suitable cross-linking agents, may be suitably adapted for use on modern production assembly lines.

Suitable as cross-linking agents are ethylenically unsaturated monomers, especially styrene and vinyl toluene, which act as solvents for the polyester to reduce viscosity and which also are capable of reacting with the ethylenically unsaturated double bonds of the polyester, in the presence of the suitable initiator for the reaction, to form chemical cross-links and thereby give rise to a hardening action, while at the same time becoming incorporated within the hardened film as an integral part of it. As a further precaution it is usual to initiate the hardening process at a temperature as little elevated above ambient temperature as practicable, and to select monomers with a reasonably low volatility under such conditions. The uneconomic loss of organic solvent during the hardening process referred to above is thereby minimised.

Cross-linking reactions between unsaturated polyester resins and monomers moreover leading to hardening may be effected at substantially ambient temperature when initiated by means of ultra-violet light, by means of chemical initiator/activator systems or by means of high energy electrons.

In order to achieve fast and economically attractive rates of hardening it is desirable that polyesters having branched molecular configurations should be used, such as may be converted to a complete molecular network with a minimal number of cross-links, and this poses practical difficulties, inasfar as highly branched molecular configurations give rise to poor solubility of styrene and vinyl toluene in unsaturated polyester. In particular, by the methods of the prior art, there has been difficulty in providing unsaturated polyester solutions in copolymerizable monomer, for fast hardening, at a sufficiently low viscosity for application by means of a conventional spray gun, in which atomisation of the composition is effected by means of gas under pressure.

Thus it is known to prepare unsaturated polyester resins from fumaric acid and tetrahydrophthalic anhydride used in a ratio of about 1.3 to 1.0 by weight as the difunctional acid components condensed with a mixture of difunctional hydroxy compounds, (namely diols) and a small proportion of tri-functional hydroxy compounds (namely glycerine) but solutions of such unsaturated polyester resins in the preferred monomer, namely styrene, are viscous and, on addition of further styrene to reduce the viscosity to a value suitable for spraying, develop haziness before a sufficiently low viscosity is reached. The addition of further styrene leads to incompatibility and phase separation.

It is also known to prepare similar polyester resins in which lower ratios of fumaric acid to tetrahydrophthalic anhydride are used, which resins may be diluted satisfactorily with styrene to, for example, solids contents of about 25 percent by weight, thereby giving viscosities sufficiently low for many purposes, but inasfar as the reactive residual sites for subsequent cross-linking are provided primarily by the fumaric acid content (which is ethylenically unsaturated), such polyester resins tend to have inferior hardening properties.

The present invention provides a curable composition (referred to hereinafter as the thinnable composition) comprising a mixture of an unsaturated polyester resin with styrene or vinyl toluene, and at least 0.1 percent by weight on the weight of the polyester resin of a copolymerizable monomeric unsaturated ester containing a hydroxyl group in its molecule, the composition being thinnable with styrene or vinyl toluene to a desired application viscosity without passing the haze point of the mixture.

The invention also includes the curable coating composition which may be formed by this thinning step, which coating composition has a suitable viscosity for application and comprises a clear non-hazing mixture of an unsaturated polyester resin, styrene or vinyl toluene, and at least 0.1 percent by weight on the weight of the polyester resin of a copolymerizable monomeric unsaturated ester containing a hydroxyl group in its molecule.

The haze point of a mixture of polyester resin and styrene (and also unsaturated hydroxy-ester when present) may be determined by placing 10 ml of 80 percent solids polyester resin (in styrene or in a mixture of styrene and unsaturated hydroxy-ester) in a 100 ml beaker, placing the beaker on a black and white surface (e.g., newsprint), and running in styrene at 18° C. to 20° C. with stirring until the black/white boundary blurs when viewed through the liquid. This is the haze point, and it can be quite accurately measured by this method. The addition of further styrene involves passing the haze point and leads to phase separation. Mixtures at the haze point give rise to coating films which are lacking in clarity, and are liable to instability in storage.

It is prefereed to use styrene as co-monomer for the reasons of low volatility, economic cost and in general ready copolymerizability with a wide range of unsaturated polyester resins, but vinyl toluene is in many respects a satisfactory alternative. Hereafter it is to be understood that in general when styrene is referred to, vinyl toluene may be used in place of part of all of the styrene.

The polyester resin of the compositions of the present invention may be formed from a variety of monomers, of which the following are examples:

Alicyclic discarboxylic component: discarboxylic acids or anhydrides, e.g., tetrahydrophthalic anhydride and hexahydrophthalic anhydride.

Other dicarboxylic component: aromatic acids and anhydrides, e.g., phthalic anhydride and aliphatic acids, e.g., adipic and sebacic acids.

Unsaturated component: generally dicarboxylic acids containing a single $\alpha$-$\beta$-ethylenically unsaturated double bond per molecule, preferably maleic acid and anhydride, fumaric acid, and itaconic acid.

Di-functional hydroxy component: glycols, e.g., ethylene, di-ethylene, propylene, neopentylene and butylene glycols.

Component with a functionality greater than two: normally a hydroxy component and is preferably glycerine, pentaery-thritol, hexanetriol, trimethylolethane or trimethylol-propane. This component may also be acidic, for example minor amounts of trimellitic acid or anhydride may be used.

The polyester resin need not contain components from all the groups listed above. More than one component from a group may be included; in particular, it may be advantageous to use a mixture of glycols.

Preferred polyester resins are those which are capable of being rapidly cured to a tack-free state. Rapid hardening properties of this kind are believed to be promoted by increasing the contents of poth polyfunctional and alpha-beta ethylenically unsaturated components. However, these two components, perhaps by increasing the three-dimensional complexity and rigidity respectively of the polyester molecules, tend to lead to reduced compatibility with solvents in genera, and, in particular, the copolymerizable monomers. It is an advantage of the present invention that polyester resins having desirable rapid hardening properties can be diluted down to application viscosities without hazing or phase separation. The invention is of particular advantage in thinning unsaturated polyester resins for application which cannot be reduced to a desired viscosity without hazing by means of styrene and/or vinyl toluene alone.

Thus in the case where the unsaturated polyester resin comprises alpha-beta ethylenically unsaturated dicarboxylic acid and alicyclic dicarboxylic anhydride this invention is of particular advantage in respect of polyester resins having a molar ratio of alpha-beta ethylenically unsaturated dicarboxylic acid to other dicarboxylic acid (including alicyclic components, whether unsaturated or not) of at least 1.3, preferably at least 1.5 and most preferably at least 1.67. The terms "acid" and "acid component" are used in this specification to include anhydride where appropriate. Acids and corresponding anhydrides are interchangeable technically but give rise to minor differences in these ratios.

The invention is also of particular advantage in respect of polyester resins in which tri- or poly-functional component is present in a molar proportion of at least 2.0 percent, preferably at least 3.5 percent and most preferably at least 4%. The maximum molar proportion of tri- or poly-functional component which can usefully be employed depends on the nature of the dicarboxylic components present and on other factors, but is generally not more than 10 percent and may frequently be six percent.

The preferred alicyclic dicarboxylic anhydride is tetra-hydrophthalic anhydride which, as is well known, inparts good curing properties under a wide range of conditions. Alicyclic dicarboxylic anhydride may be partly or wholly replaced if desired with aliphatic or aromatic dicarboxylic acid component, but curing properties are reduced thereby. Incorporation of aliphatic dicarboxylic component such as adipic acid tends to lower the solid content in styrene at haze point, incorporation of aromatic dicarboxylic component tends to raise it significantly. There is no reason why all the discarboxylic component should not be alpha-beta ethylenically unsaturated if desired provided the content of hydroxy component with functionality greater than two approaches zero; compositions based on such resins and styrene are useful for some purposes.

In addition to styrene, the compositions of this invention also contain a monomeric ester containing a hydroxyl group in its molecule, which ester contains an ethylenically unsaturated group making it copolymerizable with the polyester and the styrene. Now, clear solutions of polyester in styrene have a rather lower viscosity than clear solutions of the same polyester content in a mixture of styrene and, e.g., hydroxyalkyl methacrylate. In view of this, it is surprising that the presence of a small amount of hydroxyester in the polyester-styrene mixture makes it possible to add so much more styrene to the mixture that the viscosity at the haze point is actually lower than it would have been without the hydroxy-ester.

A preferred class of hydroxy-esters is that having the formula $CH_2{:}CR{\cdot}COOR^1$, where R is a hydrogen atom or a methyl or ethyl group, and $R^1$ is a hydroxy-substituted alkyl group having from one to 16 carbon atoms. Commercially available examples are $\beta$-hydroxyethyl and $\beta$-hydroxypropyl acrylates and methacrylates. Another class of hydroxy-esters are the half esters of glycols having the general formula $HO{\cdot}CHR{\cdot}CHR{\cdot}(O{\cdot}CHR{\cdot}CHR)_n{\cdot}OH$ (where $n$ is an integer from zero to 12 and R is as defined above) with $\alpha$-$\beta$-ethylenically unsaturated acids; an example is diethylene glycol mono-methacrylate. Factors which should be taken into account in selecting a hydroxy-ester for use in the invention, in addition to reducing the solids content at the haze point, include volatility, speed of copolymerization with the styrene and the polyester resin under the condition chosen, freedom from unpleasant odour, and flash point.

The compositions of this invention are thinnable (or have already been thinned) to a viscosity which is suitable for application to a substrate. Application viscosities by known methods are generally not more than 4 poise; for example, curtain coating processes often require a viscosity of about 3 poise, while spraying processes often require viscosities of the order of 0.5 to 1.0 poise.

The amount of styrene which may be added to the polyester resins in compositions of the present invention depends in large measure on the proportions of hydroxy-ester to polyester resin. As previously stated, the compositions contain at least 0.1 percent by weight of the hydroxy-ester on the weight of the polyester resin; the preferred range is from 1 to 50 percent, particularly from 2 to 15 percent, by weight of hydroxy-ester on the weight of the polyester resin. The greater cost of the hydroxy-ester, compared to styrene, makes it economically desirable to use as little hydroxy-ester as possible, and it is preferred for this reason that the coating composition shall contain so much styrene as to be quite close to its haze point.

As will be apparent from what has been said, the proportion of styrene to polyester resin in the compositions of this invention is of really no consequence. In the thinnable compositions, it will generally be convenient to use from 20 to 100 percent by weight of styrene on the weight of the polyester resin in order to obtain a fluid of convenient handling viscosity, of, e.g., 8 to 10 poise. The coating composition itself will generally contain from 25 to 200 percent by weight of styrene on the weight of the polyester resin as required to provide a suitable application viscosity.

As is the case with conventional polyester resin formulations, the compositions of this invention may contain catalysts, pigments, fillers and other additives. Conventional non-polymerizable solvents such as ketone may be added to assist the incorporation of additives such as cellulose acetate butyrate, but preferably in minor amount only as they are lost through evaporation during the hardening process.

In the experimental data which follows, the polyesters used were prepared as follows:

Formulation for resin A

| Component | Modular Ratio | | Weight % |
|---|---|---|---|
| Tetrahydrophthalic anhydride | 2.25 | | 25.9 |
| Fumaric acid | 3.75 | | 32.8 |
| Glycerine | 0.64 | | 4.6 |
| Ethylene glycol | | 2.56 | 12.0 |
| Diethylene glycol | | 3.08 | 24.7 |
| Hydroquinone | | | 0.03 |
| Toluol (removed at end of reaction) | | | approx. 2 |

All the reactants except half the hydroquinone were charged to the reaction vessel, concentration being adjusted to give a reflux temperature of 165° C. Water was continuously removed from a Dean and Stark separator and the temperature of reflux was raised gradually to 175° C. and maintained at 175° C. to an acid value of 32. (All the resins in the series hereunder had final acid values in the range 30–33 mgm KOH per gram). The acid value is not critical, but it will generally be found preferable to use resins having acid values below 50. The mixture was cooled to 130° C. and the other half of the hydroquinone was added. The mixture was further cooled to 100° C. and styrene added slowly with stirring to give a final solids contant of 65 percent.

Resins B and C have different glycerine contents, but were prepared as resin A. Details are given in Table I below, together with viscosities (at 65 percent solids) and haze point (using styrene as diluent).

TABLE I

| Resin | Glycerine content (wt.%) | (molar %) | Viscosity (65% solids in styrene) (poise) | Solids at haze point (using styrene) (%) |
|---|---|---|---|---|
| A | 4.6 | 5.3 | 18 | 52–59 |
| B | 3.3 | 3.9 | 3.5 | 46–50 |
| C | 2.2 | 2.9 | 2.3 | 37–42 |

The effect of chain branching of the polyester resin in reducing its compatibility with styrene is apparent. In these resins, the molar ratio of unsaturated dicarboxylic acid to alicyclic dicarboxylic component was the same, namely 1.67 to 1; better compatibility with styrene could have been obtained, at the expense of rapid hardening properties, by reducing this ratio.

EXAMPLE 1

The effect of an addition of hydroxy ester is surprising in that the viscosity of a solution of unsaturated polyester resin in styrene (at a solids content above that at which hazing commences) has a lower viscosity than a corresponding solution in a mixture of styrene with the hydroxy ester. The effect is illustrated, in respect of resin B, in Table II. (HPMA is β-hydroxypropyl methacrylate).

TABLE II

| Resin B at 60% solids content | Viscosity at 25°C |
|---|---|
| — in styrene | 1.5 poise |
| — in 35:5 mixture styrene: HPMA | 1.5 poise |
| — in 30:10 mixture styrene: HPMA | 2.0 poise |

Example 2

Resin C was prepared in solution in mixtures of styrene and, as a second monomer, HEMA (β-hydroxyethyl acrylate) or HPMA, and then further diluted with styrene to haze point (at 18°–20° C.)

TABLE III

| Amount of second comonomer, as weight percentage on solid resin. | Solids content at haze point, weight % | |
|---|---|---|
| | HPMA | HEMA |
| 0 (styrene only) | 38.5 | 38.5 |
| 5% | 33.5 | 33.0 |
| 10% | 28.5 | 27.5 |
| 15% | 23.5 | 22.0 |
| 20% | 18.5 | 16.7 |

EXAMPLE 3

Resin B was prepared in solution in mixtures of styrene and, as second monomer, HPMA and HEMA and similarly diluted with further styrene to haze point (18°–20° C.).

TABLE IV

| Amount of second comonomer, as weight percentage on solid resin. | Solids content at haze point, weight % | |
|---|---|---|
| | HPMA | HEMA |
| 0 (styrene only) | 47–49 | 47–49 |
| 5% | 41 | 40.5 |
| 10% | 35 | 34.2 |
| 15% | 29.5 | 28 |
| 20% | 26 | 21.6 |

EXAMPLE 4

Solutions of Resin A are prepared in mixtures of styrene and, as second comonomer, HPMA or HEMA, and diluted with styrene to haze point (18°–20° C.).

TABLE V

| Amount of second monomer as weight percentage on solid resin. | Solids content (weight %) at haze point | |
|---|---|---|
| | HPMA | HEMA |
| 0 (styrene only) | 58.5 | 58.5 |
| 4 | 51.3 | 52.1 |
| 8 | 44.1 | 45.7 |
| 12 | 36.8 | 39.4 |
| 16 | 29.5 | 33.1 |

EXAMPLE 5

Solutions of Resin A were prepared in mixtures of vinyl toluene and, as second comonomer, HPMA, and diluted with vinyl toluene to haze point.

TABLE VI

| Amount of second monomer as weight percentage on solid resin. | Solids content (weight %) at haze point |
|---|---|
| | HPMA |
| 0 (vinyl toluene only) | 76.5 |
| 10 | 69.8 |
| 20 | 63 |
| 30 | 56 |
| 40 | 49.2 |

EXAMPLE 6

In order to determine the effect of hydroxypropyl methacrylate on the rate of cure of a rapid hardening polyester resin under ultraviolet light a solution was prepared as follows:

| Resin A (65% solids) | 77.00 |
|---|---|
| β-Hydroxypropyl methacrylate | 6.00 |
| Styrene | 15.75 |
| Benzil photosensitiser | 1.25 |
| | 100.00 |

The viscosity was 1.8 poise at 25° C., and the solids content was 50 percent.

When coated on to a substrate of glass at a wet film thickness of about 0.05 mm. and irradiated at a distance of 11 cm. by means of high pressure mercrucy discharge lamps working at 4 × 125 watts the coating became sand-dry in 6 minutes.

For comparison a similar composition but without the addition of β-hydroxypropyl methacrylate was prepared at the lowest solids content attainable by thinning with styrene along, namely 60 percent. Applied and irradiated in a similar manner, this coating also became sand-dry in 6 minutes, showing that the presence of the hydroxy methacrylate monomer has no adverse effect on the curing rate under ultraviolet light.

When an attempt was made to prepare a similar composition at a solids content of 50 percent using styrene alone, without an addition of hydroxy monomer, a very cloudy, heterogeneous mixture was obtained which has an apparent viscosity of 3.8 poise. The haze point of this particular resin is about 56 percent which the viscosity is also 3.8 poise. Thus, addition of styrene to the resin to bring the solids content from 56 to 50 percent had no effect on viscosity. This indicates clearly that the styrene was not going into solution at all. After 2 hours at room temperature the resin-styrene mixture (without HPMA) showed definite signs of phase separation and layers of different degrees of haze and of different viscosities had developed. The mixture was no longer free flowing and was obviously a highly unstable system. After 2 days at room temperature the mixture had separated into two distinct layers of styrene and polyester/styrene solution. The sample containing HPMA under the same conditions was a perfectly clear homogeneous solution. Thus, the addition of styrene to the resin beyond its haze point did not achieve any reduction in viscosity but produced a heterogeneous unstable mixture which could not be used for surface coatings.

EXAMPLE 7

A similar solution to those described under Example 6 was prepared, but without the photosensitiser. To the sample was added 3 percent of 50:50 methyl ethyl ketone peroxide in phthalate plasticiser and 1 percent of a 6 percent solution of cobalt naphthenate in white spirit, both calculated by weight on the resin solution, and the solution spread at a wet film thickness of 0.05 mm. on glass and allowed to harden at an ambient temperature of 18°–22° C. In addition to the hardening rate the time required by the mixture containing initiator to become a gel was noted.

|  | Viscosity (poise) | Gel time (mins) | Sand-dry (mins) | Pencil hardness 20 hrs. | 6 days |
|---|---|---|---|---|---|
| 50% Resin A solution in styrene/hydroxy-propyl methacrylate | 1.8 | 9 | 180 | H | 3H |

EXAMPLE 8

This example describes the use of β-hydroxypropyl methacrylate in providing a spraying enamel for curing by irradiation with a beam of high energy electrons.

A black spraying enamel was prepared as follows:

parts by weight

| | |
|---|---|
| Resin B (100% solids) | 43.4 |
| Styrene | 21.5 |
| Carbon black | 1.3 |
| Cellulose acetate butyrate | 0.16 |
| Methyl ethyl ketone | 0.5 |
| β-Hydroxypropyl methacrylate | 4.8 |
| Styrene | 28.34 |
| | 100.00 |

The cellulose acetate butyrate was dissolved in the methyl ethyl ketone and this solution was stirred into the solution of Resin B in styrene. The carbon black was ground into this mixture in a bead mill containing 3 parts of beads of weight to 2 parts of pigment/resin/monomer mixture, by weight. The mill was run at 2,900 r.p.m. for 5 minutes. The mixture was separated from the beads and the hydroxypropyl methacrylate was added with continuous stirring. The further quantity of styrene was added slowly with stirring. The viscosity of this coating composition was 0.6 poise, and the solids content was 44.7 percent by weight.

The black enamel above was applied by conventional spray gun to 15 × 10 cm. steel panels which were passed in air under a point source of electrons of 170 kev at a current of 40 mA at a distance of 19 from the generating chamber orifice in the manner described in our copending British Pat. application Ser. No. 51441/69. At a conveyor speed of 12.5 m/min. the coating became cured to a glossy film of excellent appearance, mar-resistant and showing good adhesion to the steel substrate. The thickness of cured film was 0.025 – 0.04 mm., and the total dose of radiation was 41 Mrad.

The composition of this Example has a substantial margin of safety, in that the HPMA could have been reduced to below 4.0 percent by weight without passing the haze point of the solution.

We claim:

1. A curable composition comprising a mixture of
   i. an unsaturated polyester resin derived exclusively from carboxylic acids having a functionality of at least two and alcohols having a functionality of at least two in which the unsaturated component of the unsaturated polyester resin is an α-β-ethylenically unsaturated discarboxylic acid, and the molar ratio of α-β-ethylenically unsaturated dicarboxylic acid to all other dicarboxylic components in the polyester resin is at least 1.3:1 and in which a tri-or poly-functional component is present in the polyester in a molar ratio of at least 2 percent,
   ii. styrene or vinyl toluene, and
   iii. from 0.1 to 50 percent, by weight, of the unsaturated polyester resin, of a copolymerizable mononmeric compound selected from hydroxy esters having the formula
   CH₂CR.COOR'
   where R is a hydrogen atom, or a methyl and ethyl group and R' is a hydroxy-substituted alkyl group having from one to 16 carbon atoms, and half-esters of glycols having the general formual HO.CHR.CHR.(O.CHR.CHR)$_n$OH
   wherein $n$ is an integer from 0 to 12 and R is a hydrogen, or a methyl or ethyl group,
      with α,β-ethylenically unsaturated monocarboxylic acids,
   said curable composition having a suitable viscosity for application or being thinable with styrene or vinyl toluene to such a viscosity.

2. A composition as claimed in claim 1, wherein the copolymerizable monomeric unsaturated ester containing a hydroxyl group in its molecule has the general formula: $CH_2:CR \cdot COOR^1$
where R is a hydrogen atom or a methyl or ethyl group, and $R^1$ is a hydroxy-substituted alkyl group having from one to 16 carbon atoms.

3. A composition as claimed in claim 1, wherein the copolymerizable monomeric unsaturated ester containing a hydroxyl group in its molecule is present in a proportion of from 2 to 15 percent by weight on the weight of the unsaturated polyester resin.

4. A curable composition as claimed in claim 1 comprising a mixture of
   i. an unsaturated polyester resin having an acid value of not more than 50, in which resin the unsaturated component is an $\alpha$-$\beta$-ethylenically unsaturated dicarboxylic acid, the molar ratio of $\alpha$-$\beta$-ethylenically unsaturated acid to all other dicarboxylic components being at least 1.3:1, and in which a tri- or poly-functional component is present in a molar proportion of at least 2.0 percent, and
   ii. styrene or vinyl toluene, in a proportion of not more than 500 percent by weight on the weight of the unsaturated polyester resin and,
   iii. from 1 to 50 percent, by weight on the weight of the unsaturated polyester resin, of a copolymerizable monomeric unsaturated ester having the formual $CH_2:CR \cdot COOR^1$
where R is a hydrogen atom or a methyl or ethyl group, and $R^1$ is a hydroxy-substitiute alkyl group having from one to 16 carbon atoms,
the composition being thinnable with styrene or vinyl toluene to a viscosity of 4.0 poise without passing the haze point of the mixture.

* * * * *

UNITED STATES PATENT OFFICE
CERTIFICATE OF CORRECTION

Patent No. 3,760,033          Dated September 18, 1973

Inventor(s) Kenneth Harold Arbuckle and David M. Lazarus

It is certified that error appears in the above-identified patent and that said Letters Patent are hereby corrected as shown below:

Page one, first column, below the line reading "[21] Appl. No.: 123,030", insert the following:

-- [30]    Foreign Application Priority Data

March 18, 1970   Great Britain.......13156/70 --.

Signed and sealed this 2nd day of April 1974.

(SEAL)
Attest:

EDWARD M.FLETCHER,JR.              C. MARSHALL DANN
Attesting Officer                  Commissioner of Patents